United States Patent
Beaudry et al.

(12) United States Patent (10) Patent No.: US 10,475,341 B1
(45) Date of Patent: Nov. 12, 2019

(54) SYSTEM AND METHOD OF MAINTAINING TRAFFIC APPARATUS LOCATION INFORMATION

(71) Applicant: VER-MAC, Quebec (CA)

(72) Inventors: Serge Beaudry, St-Lambert-de-Lauzon (CA); Alexandre Langlois, Shannon (CA)

(*) Notice: Subject to any disclaimer, the term of this patent is extended or adjusted under 35 U.S.C. 154(b) by 0 days.

(21) Appl. No.: 16/059,152

(22) Filed: Aug. 9, 2018

(51) Int. Cl.
| | |
|---|---|
| *G08G 1/097* | (2006.01) |
| *G08G 1/0967* | (2006.01) |
| *B60W 40/04* | (2006.01) |
| *G08G 1/01* | (2006.01) |
| *G01S 11/06* | (2006.01) |
| *H04W 64/00* | (2009.01) |
| *G06F 16/29* | (2019.01) |

(52) U.S. Cl.
CPC ............ *G08G 1/097* (2013.01); *B60W 40/04* (2013.01); *G01S 11/06* (2013.01); *G06F 16/29* (2019.01); *G08G 1/0116* (2013.01); *G08G 1/0145* (2013.01); *G08G 1/096783* (2013.01); *H04W 64/003* (2013.01)

(58) Field of Classification Search
CPC . G08G 1/097; G08G 1/096783; B60W 40/04; G06F 16/29
USPC ........................................................ 340/907
See application file for complete search history.

(56) References Cited

U.S. PATENT DOCUMENTS

| | | | |
|---|---|---|---|
| 6,864,784 B1* | 3/2005 | Loeb ............... | G08G 1/096716 180/171 |
| 7,382,274 B1* | 6/2008 | Kermani ........... | B60K 31/0058 340/435 |
| 8,254,338 B2* | 8/2012 | Anschutz ........... | G06Q 30/02 370/332 |
| 2013/0018705 A1* | 1/2013 | Heath ................. | G08G 1/017 705/13 |
| 2013/0321209 A1* | 12/2013 | Kalliola .................. | G01S 5/02 342/419 |

* cited by examiner

*Primary Examiner* — John A Tweel, Jr.
(74) *Attorney, Agent, or Firm* — Cozen O'Connor (57) ABSTRACT

A system and method of acquiring and maintaining location information associated with traffic apparatus deployed in connection with a traffic flow monitoring or regulation system are disclosed. In some implementations, an apparatus identifier may distinguish a particular traffic apparatus from others that are deployed in proximity, and a functional identifier may define a functionality of the particular traffic apparatus; positioning, orientation, and movement or acceleration data may also be provided for real-time or near real-time system applications. These apparatus data may be used to derive and to maintain a record of location data associated with each traffic apparatus deployed in a particular application.

41 Claims, 4 Drawing Sheets

SYSTEM AND METHOD OF MAINTAINING TRAFFIC APPARATUS LOCATION INFORMATION

FIELD OF THE DISCLOSURE

Aspects of the disclosed subject matter relate generally to road-side traffic apparatus, and more particularly to a system and method of acquiring and maintaining location information associated with such apparatus deployed in connection with a traffic flow monitoring or regulation system.

BACKGROUND

Traffic flow information and pattern regulation are useful tools for informing motorists of congestion, hazards, accidents, police or highway safety personnel activity, and the like.

Some traffic flow and pattern control apparatus may be deployed in construction zones, for example, or in areas such as freeway interchanges or toll plazas where traffic congestion is regular or frequent, or in areas requiring temporary rerouting of vehicular traffic. In that regard, many such traffic flow and pattern control apparatus are designed to be portable, or at least moveable (i.e., they may not be permanently affixed to or integrated into the roadway or other immovable infrastructure).

Additionally, some traffic monitoring systems (such as those provided by Signalisation Ver-Mac™ Inc.) acquire and transmit traffic flow data to a remote system which processes data for use in connection with one or more applications. A typical traffic flow monitoring and regulation system may, for example, update road-side or overhead signage with information concerning traffic patterns that a motorist may expect to encounter some distance ahead. Additionally or alternatively, such traffic data may be provided to third party mapping and navigation tools, providing a user of such a tool with real-time or near real-time information concerning traffic conditions where they are being monitored. In connection with these and other systems, it may be useful to identify the location of each traffic flow and pattern control apparatus placed on or near the route being monitored or controlled.

Installation of permanent or long-term traffic sensors is a relatively complicated task, involving wiring, installation of communications equipment, and providing solid anchorage or a permanent support structure. On the other hand, since the equipment is permanent or deployed for an extended period, power consumption is usually not a limiting factor for the equipment utilized, as the powered sensor components are either connected to a local utility power grid or accompanied by a government or commercial generator.

The challenges associated with providing temporary or portable traffic sensors and other flow and pattern control apparatus are very different from those associated with deploying permanent or long term fixtures. Applications for these portable apparatus include construction sites, warning of speed limit changes, lane or road closures, and temporary flagging or road hazards such as rock slides, bridge damage, lighting failures, traffic collisions, law enforcement activity, and the like. It is often desirable that a portable traffic apparatus be light-weight but sturdy, easily moveable to a suitable location, visible to motorists to prevent damage or destruction, and self-powered, since a portable device may not always be positioned such that it may readily be wired to electric utility services. Portability may be desirable for many applications, as investment in a permanent physical infrastructure is not required and because a traffic apparatus may quickly and selectively be deployed only where it is needed. As noted above, however, portable structures may be moved, and so it may be useful in many applications to acquire and to maintain accurate location information for each such apparatus that is deployed.

Therefore, there is a need for an improved system and method of acquiring and maintaining location information associated with such apparatus in connection with a traffic flow monitoring or regulation system.

SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the invention in a simplified form as a prelude to the more detailed description that is presented later.

The present disclosure describes a system and method of acquiring and maintaining location information associated with traffic flow and pattern control apparatus used in connection with a traffic flow monitoring or regulation system. The purpose and location of each such apparatus deployed in a traffic pattern control application may be acquired and maintained, for example, to monitor, verify, or modify a traffic flow control strategy. In that regard, a beacon or transceiver may transmit a signal indicative of a functionality associated with an apparatus, and the location of the beacon may be acquired or recorded; in the foregoing manner, a map or other record of apparatus purposes and locations in space may be accurately maintained. Additionally or alternatively, cellular signals, global positioning system (GPS) implementations, or other positioning sensors may be employed either individually or in combination with navigational aids or other mapping applications to identify a particular location of a particular apparatus along a roadway to be monitored or controlled.

In accordance with one embodiment, a method of acquiring and maintaining location information associated with a traffic apparatus may generally comprise: affixing a beacon system to the traffic apparatus, the beacon system operative to broadcast apparatus data associated with the traffic apparatus to a remote device; capturing the apparatus data responsive to a measure of a signal strength of the beacon system; deriving location data associated with the traffic apparatus responsive to said capturing; and recording a location of the traffic apparatus in space based upon the deriving. In some implementations, the beacon system is operative to broadcast the apparatus data periodically at a frequency. In accordance with the disclosed subject matter, various aspects of the method may include: wherein the capturing is responsive to a peak signal strength; wherein the deriving comprises utilizing the apparatus data; and wherein the beacon system is operative to broadcast the apparatus data responsive to a proximity of the remote device. In one such implementation, the deriving comprises utilizing positioning data resident on the remote device.

The apparatus data may include a unique apparatus identifier, a functional identifier associated with a function of the traffic apparatus, or both.

A disclosed the method may further comprise transmitting the apparatus data from the remote device to a computer processing system; in one such embodiment, the deriving may comprise utilizing the computer processing system. Additionally or alternatively, the recording may comprise utilizing the computer processing system. In some embodiments utilizing a computer processing system, a method may further comprise transmitting the location data from the computer processing system to a third party platform.

In accordance with another aspect of the disclosure, a traffic apparatus location system may generally comprise: a traffic apparatus; a beacon system affixed to the traffic apparatus, the beacon system to broadcast apparatus data associated with the traffic apparatus; a remote device to receive the apparatus data broadcast by the beacon system; and a computer processing system to receive information associated with the apparatus data from the remote device; wherein the apparatus data are used to derive location data associated with a location of the traffic apparatus. In some such systems, the location data are included in the apparatus data broadcast by the beacon system.

The beacon system may be operative to broadcast the apparatus data periodically at a frequency; additionally or alternatively, the beacon system may be operative to broadcast the apparatus data responsive to a proximity of the remote device. In this latter embodiment, the location data may be derived based on a location of the remote device. The location data may be derived by the remote device, or the location data may be derived by the computer processing system. In some implementations, the apparatus data include a unique apparatus identifier, a functional identifier associated with a function of the traffic apparatus, or both.

In some systems, the remote device is a wireless telephone and in others, the remote device is a tablet computer. In some embodiments of a system, the beacon system comprises a wireless transceiver and is configured and operative to initiate the broadcast responsive to a signal from the remote device. The beacon system may generally comprise one of a global positioning system sensor, a gyroscope, an altimeter, a compass, and an accelerometer. In some embodiments, the computer processing system is operative to transmit the location data to a third party platform.

In accordance with another aspect of the disclosed subject matter, a traffic apparatus may generally comprise: a structure to convey information to a motorist; and a beacon system affixed to said structure, said beacon system to broadcast apparatus data associated with said structure to a remote device configured and operative receive the apparatus data broadcast by said beacon system; wherein the remote device transmits information associated with the apparatus data to a computer processing system and the apparatus data are used to derive location data associated with a location of said structure. In some apparatus, the structure comprises one of a drum, a delineator, a cone, a flasher, a fixed sign, a placard, a barricade, and a programmable sign; in accordance with the disclosure, the structure may comprise one identified in the Manual on Uniform Traffic Control Devices.

The beacon system may generally comprise a memory to store the apparatus data. The memory may be selectively programmable, for instance, and the apparatus data may be selectively programmed. In some apparatus embodiments, the beacon system is operative to broadcast the apparatus data periodically at a frequency; additionally or alternatively, the beacon system is operative to broadcast the apparatus data responsive to a proximity of the remote device.

As noted above with reference to other embodiments, the apparatus data may include a unique apparatus identifier, a functional identifier associated with a function of the structure, or both. In some disclosed embodiments, the functional identifier is selectively programmable.

In some implementations of a traffic apparatus, the beacon system generally comprises a wireless transceiver and is configured and operative to initiate the broadcast responsive to a signal from the remote device. Embodiments are disclosed wherein the location data are derived by the beacon system. The beacon system may generally comprise one of a global positioning system sensor, a gyroscope, an altimeter, a compass, and an accelerometer. In some embodiments of a traffic apparatus, the structure is portable.

The foregoing and other aspects of various disclosed embodiments will be apparent through examination of the following detailed description thereof in conjunction with the accompanying drawing figures, in which like reference numerals are used to represent like components throughout, unless otherwise noted.

DETAILED DESCRIPTION

Certain aspects and features of the disclosed subject matter may be further understood with reference to the following description and the appended drawing figures. In operation, a system and method of acquiring and maintaining traffic apparatus location information in connection with a traffic flow monitoring and regulation system may transmit information regarding the purpose and location of a traffic apparatus to a remote server or computer system. Specifically, the present disclosure provides for a power efficient traffic apparatus data collecting system which acquires and maintains location and functionality data associated with traffic apparatus employed in the field, and transmits those data to a remote or distant computer server or computing platform such as, for instance, those associated with smart work or construction zones or other traffic management systems or platforms.

Those of skill in the art will appreciate that, to accommodate or to maximize portability, a traffic flow data collection strategy such as described below may effectuate communications with a remote computer system via any of various wireless technologies such as wireless fidelity (WiFi) protocols, satellite or cellular communications standards, and the like. The present disclosure is not intended to be limited by the nature or functional characteristics of the communications hardware or signaling methodologies used to enable the disclosed traffic apparatus to communicate apparatus data to a remote computer system, nor is it intended to be limited by the purpose or operation of the remote computer system itself.

Figure 1:
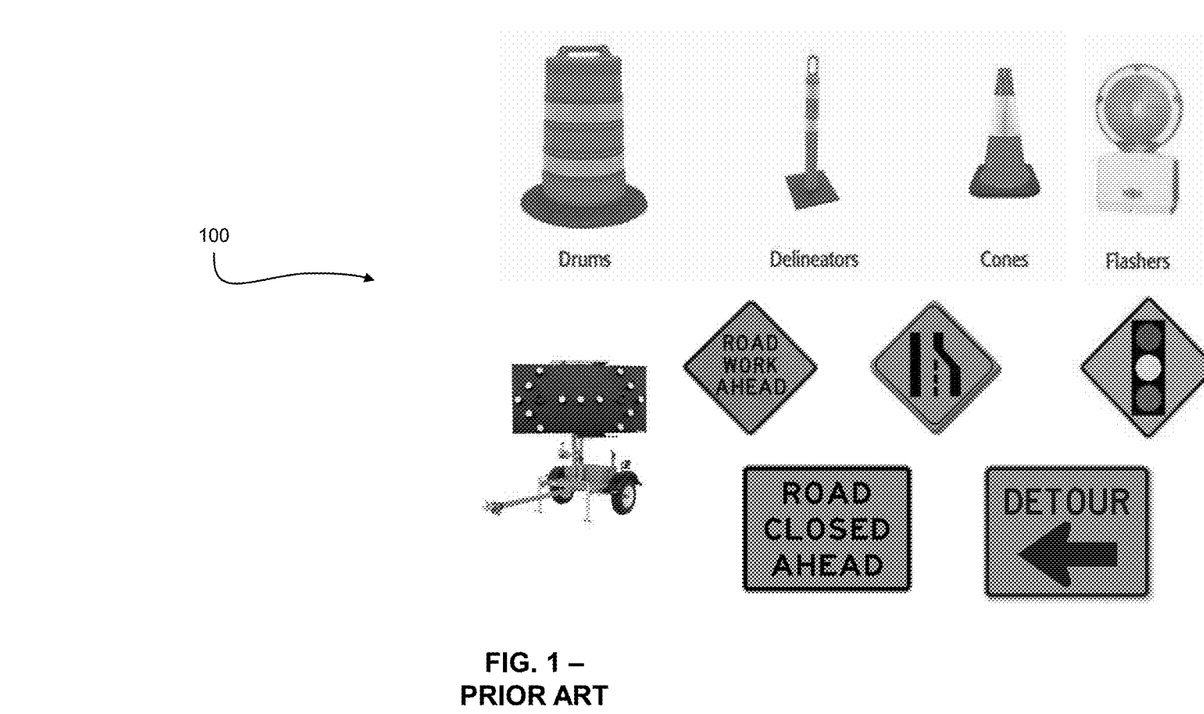
FIG. 1 illustrates a variety of traffic flow and pattern control apparatus to which the disclosed subject matter pertains.
Figure 2:
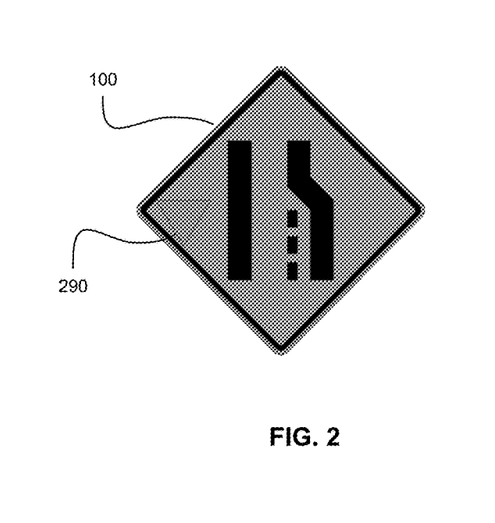
FIG. 2 is an elevation view of a traffic flow and pattern control apparatus modified for use in connection with the disclosed subject matter.

Turning now to the drawing figures, FIG. 1 illustrates a variety of traffic flow and pattern control apparatus to which the disclosed subject matter pertains, and FIG. 2 is an elevation view of a traffic flow and pattern control apparatus modified for use in connection with the disclosed subject matter. FIG. 1 depicts various types of traffic apparatus 100 that are familiar to most motorists: drums; delineators; cones; flashers; fixed signs or placards (such as "Road Work," "Merge Left Ahead," "Road Closed," "Detour," and "Traffic Signal Ahead" signs); and variable or selectively programmable lighted signs. It will be appreciated that numerous other signs and structures are used in the art or may be developed that may have utility in connection with traffic control applications, and that the present disclosure is not intended to be limited to any particular subset of traffic signage or traffic flow devices. In that regard, in the context of the present disclosure, the terms "traffic flow and pattern control apparatus" and "traffic apparatus" are intended to encompass each of the traffic apparatus 100 illustrated in FIG. 1 as well as other signs, devices, structures, and informative instruments used to signal or to alert vehicular traffic to road conditions, speed limits or hazards, or to provide other information, as is generally known in the art. Examples of such traffic apparatus for use in Canada and the United States may be found, for example, in the Manual on Uniform Traffic Control Devices (the "MUTCD") or in other analogous or counterpart publications in other jurisdictions.

For example, traffic apparatus 100 may be implemented as a barricade or other free-standing road-side structure that is light-weight, readily portable, and crash-certified. In that regard, it is noted that many governmental bodies or highway safety organizations require a safety or crash certification before a traffic apparatus 100 may be deployed roadside or near traffic patterns, even in emergency scenarios. Accordingly, those of skill in the art will appreciate that design aspects of commercial embodiments of traffic apparatus 100 may be implemented as a function of local, state, or federal statutes or applicable regulations. The present disclosure is not intended to be limited to any particular implementation of the hardware components, materials, or communications protocols illustrated and described with reference to the drawing figures to the extent that any of these elements may be influenced or directed by statute or regulation or other design considerations.

Traffic apparatus 100, in any of its various embodiments, may be constructed of a variety of materials generally known in the art having suitable strength, weight, weather durability, and ultraviolet (UV) light resistant characteristics. Examples include plastics, polyvinyl chloride (PVC), painted, coated, or weather-treated metals such as stainless steel, aluminum, and suitably weather-resistant alloys, ceramics, and other moldable or formable materials that have utility in outdoor and inclement weather applications. The present disclosure is not intended to be limited by the materials or structural configuration of traffic apparatus 100, though an intended functionality of a particular traffic apparatus 100 may influence the instant system and method as set forth below. By way of example only, and not by way of limitation, a signage embodiment of traffic apparatus 100 is depicted in FIG. 2 (i.e., "Merge Left").

As set forth below, traffic apparatus 100 may generally include a beacon system 290, which may be mounted, affixed, or otherwise attached to or integrated into a structural element of traffic apparatus 100, which as noted above, may be embodied in or comprise a barrel or impact absorbing cylinder, a sign (as in FIG. 2), a cone, a barricade, a flasher, or other device. In some embodiments, some powered components of traffic apparatus 100 (such as a flasher or lighted elements) may receive electrical power from a solar panel, a small windmill deployed on traffic apparatus 100 or proximate thereto, a battery source, or a combination of these and other power sources. Standard, wired electrical service may be appropriate in some instances; for example, a nearby truck or trailer supporting an electric generator may be employed to power electrical components of traffic apparatus 100, though to maximize portability, wireless or fully integrated power sources (such as photovoltaic (PV) panels or battery packs) may be used. As set forth below, traffic apparatus 100 may be so constructed and dimensioned as to render it sufficiently light-weight to be easily movable by a single person. Irrespective of power supplies to other components of traffic apparatus 100, in some embodiments, beacon system 290 may be battery powered and so configured to conserve power as set forth in more detail below.

Figure 3:
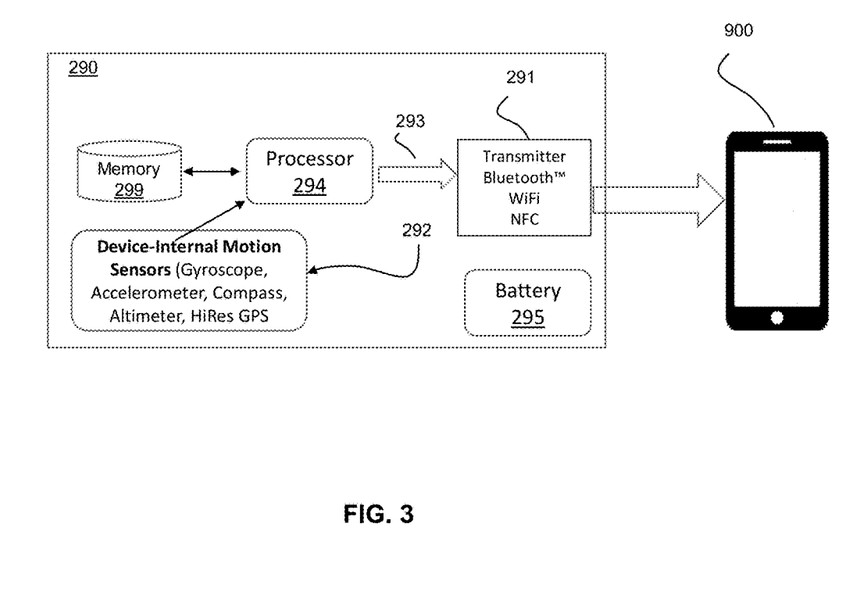
FIG. 3 is a high-level functional schematic diagram of an embodiment of a beacon system to be used in connection with a traffic flow and pattern control apparatus.

FIG. 3 is a high-level functional schematic diagram of an embodiment of a beacon system to be used in connection with a traffic flow and pattern control apparatus. As noted above, traffic apparatus 100 may generally comprise a beacon system 290 integrated with or attached to a suitable structural element as a function of the overall design and structural configuration of traffic apparatus 100. In that regard, it will be appreciated that any of various mechanical fastening elements (such as rivets, nuts and bolts, screws, clips or clamps, hook and loop fasteners, etc.), adhesives, welding or brazing techniques, and other coupling techniques or structures may be employed to affix beacon system 290 to a structural element or portion of traffic apparatus 100.

In an implementation, beacon system 290 generally comprises a wireless transmitter 291, such as a transmitter operative in accordance with Bluetooth™, WiFi, or a suitable near field communication (NFC) telecommunications standard. In operation, beacon system 290, via transmitter 291, may transmit certain information (such as GPS or other location data as well as identification data associated with the nature or operational characteristics of traffic apparatus 100) to a remote device (depicted in FIG. 3 as a wireless telephone identified by reference numeral 900). In that regard, beacon system 290 may also comprise a memory 299 that may store data associated with the functionality or intended purpose of traffic apparatus 100. In certain implementations in which memory 299 may be selectively reprogrammable, beacon system 290 may also include a wireless transceiver or suitable wired hardware interface (not shown), such as a universal serial bus (USB), DockPort jack, or other suitable data interface to allow data transfer to memory 299, enabling definition of the operability and functional characteristics of beacon system 290, and thereby, of traffic apparatus 100.

By way of example, memory 299 may maintain data associated with the specific traffic apparatus 100 ("apparatus data") to which beacon system 290 is affixed or attached. Such apparatus data may include a serial number, apparatus code, or other identifier that may have utility in enabling a system operator or administrator to identify or to distinguish a unique traffic apparatus 100 from a plurality of same that are deployed in a particular traffic control application. Additionally or alternatively, such apparatus data may include a code, a series of bits or data words, or other indicator sufficient to identify the type or operational characteristics of traffic apparatus 100 in a particular application. In particular, such a code or identifier stored in memory 299 may identify the traffic apparatus 100 to which beacon system 290 is attached as a cone, a barrel, a barricade, or a sign (FIG. 2);

more particularly, such a code or identifier may further classify traffic apparatus 100 in accordance with the information, if any, provided to nearby motorists. For example, apparatus data may be used to characterize a sign as conveying particular information, such as "10 MPH Zone," "Merge Left Ahead" (FIG. 2), "Yield," "Detour Left," and the like. In that regard, each of the various traffic apparatus 100 illustrated in FIG. 1 may have a unique code or identifier to specify its function and to distinguish that function from others. Additionally, as noted above, another code or identifier may distinguish each individual traffic apparatus 100 from others having like functionality.

In some implementations, memory 299 may be pre-coded for a particular purpose such that apparatus data for beacon system 290 is predetermined when memory 299 is initialized with data. In such situations, however, care must be taken by a system operator or administrator to ensure that a beacon system 290 pre-configured to operate in connection with a particular type of traffic apparatus 100 is properly affixed to a respective cone, barricade, sign, or placard, for instance, or the system in which that traffic apparatus 100 is deployed may record and maintain inaccurate data regarding the deployed arrangement of traffic apparatus 100. Additionally or alternatively, memory 299 may be selectively reprogrammed or rewritten such that beacon system 290 may be selectively programmable, for example, as a function of the type and nature of the traffic apparatus 100 to which it is affixed or attached. In this flexible embodiment, as noted above, memory 299 may be programmed wirelessly, for example, or via a USB, DockPort, or other wired communication interface such that apparatus data stored in memory 299 accurately reflect the nature and operational characteristics of the traffic apparatus 100 to which beacon system 290 is affixed. In another embodiment, memory 299 may be selectively programmed via a rocker panel, switch, or dial (not illustrated), for instance, such that beacon system 290 may be programmed to one of several functionalities in accordance with switch or dial position. For example, placing a rocker panel or toggle switch in the left position may program memory 299 to characterize beacon system 290 as a "Merge Left" indicator, while placing the rocker panel or toggle switch in the right position may program memory 299 to characterize beacon system 290 as a "Merge Right" indicator. Those of skill in the art will appreciate that memory 299 may be programmed or selectively reprogrammed in any of various ways that are generally known in the art or developed in accordance with known principles and operational characteristics of memory 299, enabling flexibility and efficiency for traffic administrator work flow when employing beacon system 290 in connection with a desired type of traffic apparatus 100.

It will be appreciated that memory 299 may be embodied in or comprise read only memory (ROM), electrically erasable programmable read-only memory (EEPROM) or other types of "flash" memory, any of various types of random access memory (RAM), or other solid-state memory device as a design choice, and generally selected as a function of power consumption, reliability, memory capacity, mean read/write cycles to failure, or a combination of these and other factors. The present disclosure is not intended to be limited by the specific implementation or technologies employed in connection with memory 299.

As indicated in FIG. 3, beacon system 290 may also comprise any of a number of different types of sensors 292. Sensors 292 may include gyroscopes, altimeters, compasses, accelerometers, GPS or other motion or positioning sensors, for example, having utility in locating and discovering the orientation of apparatus 100 in two- or three-dimensional space. In some implementations, it may be useful to communicate signals from sensors 292, via transmitter 291, to a remote system or processing platform such as device 900. In some embodiments, particularly those transmitting apparatus data in real-time or near real-time, data from sensors 292 may identify positioning, for instance, as well as acceleration or motion that may be indicative of a traffic apparatus 100 that has been moved since a previous data transmission. Comparison of successive compass data points, for example, may indicate expected, or unexpected (and therefore, undesirable), rotation of a traffic apparatus 100.

In the FIG. 3 implementation, data acquired by sensors 292 and data from memory 299 may be combined, concatenated, multiplexed, or otherwise aggregated for transmission by transmitter 291 (as indicated by aggregate data stream 293), though it may also be desirable that memory 299 or one or more sensors 292 provide apparatus data for transmission by transmitter 291 individually (i.e., in discrete or separate data streams). Accordingly, the present disclosure is not intended to be limited by the particular data flow illustrated in FIG. 3, and it is noted that the data structure and the manner in which apparatus data are provided to transmitter 291 for transmission are susceptible of numerous variations and modifications depending, for example, on the bandwidth of transmitter 291, the type and amount of apparatus data to be provided, power consumption limitations or requirements, or a combination of these and other factors. For example, it will be appreciated that a microprocessor, a microcontroller, a programmable logic controller (PLC), or other suitable data processing element may facilitate combination, aggregation, multiplexing, or other processing or pre-processing of data at beacon system 290, as illustrated at reference numeral 294, though alternatives may readily be implemented within the scope and contemplation of the disclosed subject matter.

In operation, one or more battery cells (reference numeral 295) may be used to provide operational power to the components of beacon system 290, and in particular, when and if required. As is generally known, such battery cells may employ nickel cadmium, nickel metal hydride, lithium ion, or other rechargeable or single-use battery cell chemistries or technologies that are generally known or developed according to known principals. In some embodiments, power control circuitry may be used to monitor and to regulate charge and discharge cycles for such battery cells, and to minimize or reduce battery consumption; power control circuitry may comprise or incorporate a microcontroller, a PLC, or other data processing element as is generally known.

Though not specifically illustrated in FIG. 3, it is noted that beacon system 290 may generally employ a housing or other structure that is suitably weather and element resistant to protect components 291, 292, and 299 from environmental damage, and that the materials, shock-proofing, ultraviolet resistance, and other characteristics of such a housing may be selected as a function of the sensitivities of those components, including memory 299. For example, the housing may be suitably water, weather, and ultraviolet resistant to protect beacon system 290 components from the elements, dust and road debris, salt, and the like, such as are frequently encountered in road-side, all-weather traffic monitoring and control applications.

In use, beacon system 290 may generally transmit apparatus data associated with traffic apparatus 100 to a remote processing platform such as remote device 900. As noted above, remote device 900 in the FIG. 3 embodiment is depicted as a wireless telephone, but remote device 900 may be embodied in or comprise any of various other devices such as general purpose or specifically designed tablet computers, laptop computers, personal digital assistants (PDAs), or similar portable devices having appropriate communications capabilities to receive apparatus data from transmitter 291 and to transmit those data (either in raw or processed form) to another system or computing platform as set forth below. In some implementations, for instance, apparatus data received from transmitter 291 may be processed, pre-processed, aggregated, or otherwise organized by suitable processing elements and software components at remote device 900; additionally or alternatively, it may be desirable that remote device 900 simply act as a relay to provide apparatus data from transmitter 291, unmodified, to an additional device or system.

It will be appreciated that remote device 900 may comprise one or more processing components, such as a microprocessor, microcontroller, PLC, application specific integrated circuit (ASIC), field programmable gate array (FPGA), or other data processing component having sufficient resources to receive the data transmission from beacon system 290, to execute any processing that is desirable locally (i.e., at remote device 900), and to transmit the raw apparatus data or processed data to another system. These hardware elements may be operative in accordance with software modules, operating systems, program applications, and other instruction sets (or a combination of these) as is generally known in the art.

Typically, remote device 900, when implemented as a wireless telephone or tablet computer, may have a display (such as a touch screen display) and one or more input mechanisms (such as the same touch screen display and one or more physical buttons or switches) enabling interaction with remote device 900, ordinarily via a user interface or graphical user interface (GUI). These implementations may have particular utility in applications in which remote device 900 may be employed, for example, to do some degree of processing or pre-processing of apparatus data received from beacon system 290 under control of, or influenced by, input from a user (which may be, for example, a road crew member installing or placing traffic apparatus 100). In some situations, on the other hand, it may be desirable that remote device 900 comprise or embody a simple wireless relay strategy that requires no (or minimal) user interface mechanism. In these situations, remote device 900 may be implemented as a small, light-weight, wearable electronic component (such as a smart watch, a bi-directional pager device, or other communication component) with a transceiver and sufficient telecommunications capabilities to receive apparatus data and to transmit same without any interaction with a user. For example, remote device 900 in accordance with some embodiments may be removably or fixedly attached to, or integrated into the structure of, a garment such as a vest or hard hat worn by a member of a road crew or traffic control staff member. In these embodiments, the work flow of a road crew is minimally impacted by the beacon system 290 technology deployed in connection with the traffic apparatus 100 used in a particular traffic flow control application, since user interaction with remote device 900 is not required.

Figure 4:
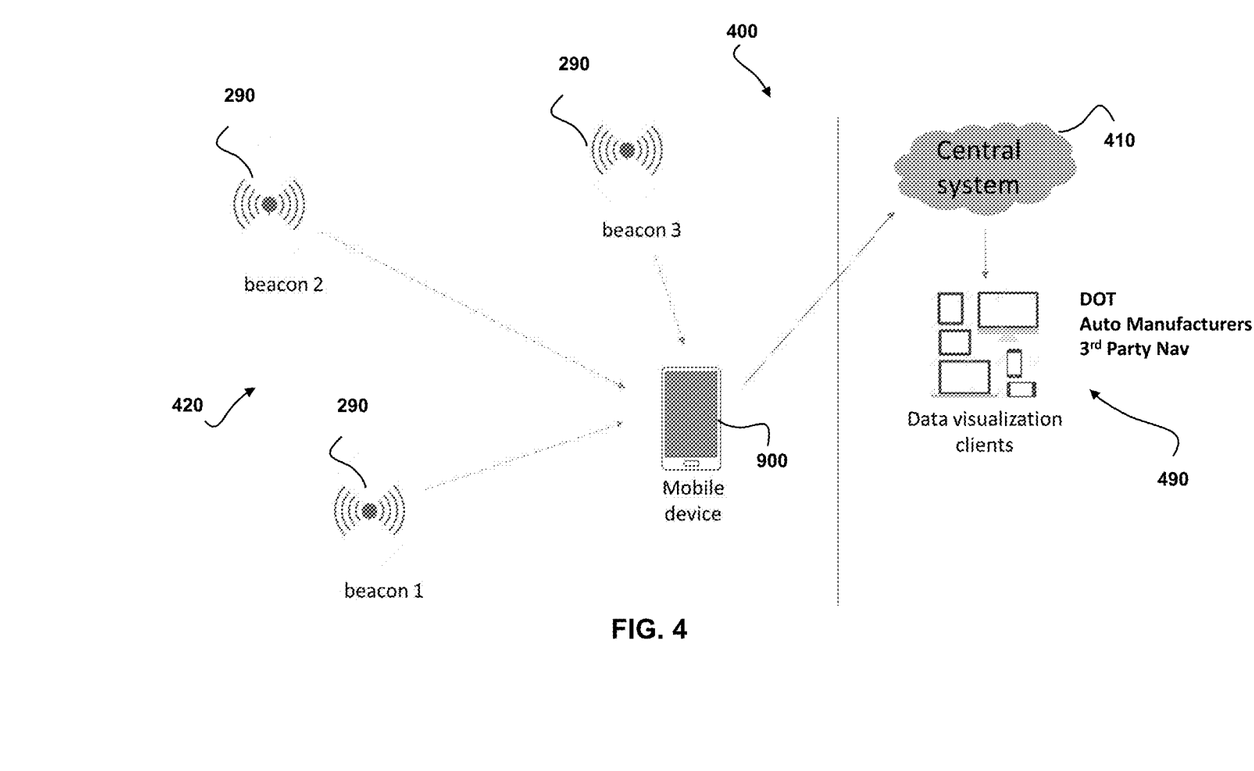
FIG. 4 is a high-level functional schematic diagram of an embodiment of a system of acquiring and maintaining traffic apparatus location information.

Turning now to an example of one implementation, FIG. 4 is a high-level functional schematic diagram of an embodiment of a system of acquiring and maintaining traffic apparatus location information. As illustrated at the left side of FIG. 4, system 400 may generally comprise an array or arrangement (reference numeral 420) of traffic apparatus 100, each of which may comprise a respective beacon system 290 substantially as described above with reference to FIGS. 2 and 3. As noted above, each respective beacon system 290 may transmit apparatus data (such as via a respective transmitter 291) to a remote device 900 deployed in proximity to the arrangement 420.

It will be appreciated that arrangement 420 may comprise more or fewer traffic apparatus 100 than illustrated in FIG. 4, and that each respective traffic apparatus 100 may serve a particular function within arrangement 420. For example, where the right-most travel lane is closed (e.g., due to construction, a collision or hazard, law enforcement activity, etc.), one or more "Merge Left" signs may be deployed upstream of a series of cones, delineators, or barricades that urge motorists to the left lane. Similarly, one or more "Detour" signs may be deployed upstream of a barricade, a "Road Closed" sign, and a "Right" arrow sign urging motorists to turn right. Those of skill in the art will appreciate that the number and type of traffic apparatus 100 deployed may be application-specific and depend upon prevailing or typical traffic conditions, the nature and threat of a particular hazard, the size or length of an area affected by the traffic flow control desired, or a combination of these and a variety of other factors. In this context, the term "arrangement" is intended to encompass the various traffic apparatus 100 and their relative positions that, collectively, are expected to effectuate a particular traffic control goal (e.g., closing a lane of traffic, causing traffic to turn off of a road, controlling the speed of vehicular traffic, warning of a hazard, and the like).

In an embodiment, remote device 900 may be configured and operative to receive apparatus data from each respective beacon system 290 while in close enough proximity to be in communication with a respective transmitter 291; this may be effectuated, for example, as a traffic apparatus 100 is being placed in arrangement 420, or it may be effectuated after all traffic apparatus 100 have been set up in desired locations. As remote device 900 is moved through arrangement 420, signal strength from each transmitter 291 may rise (e.g., as remote device 900 approaches the associated traffic apparatus 100) and fall (e.g., as remote device 900 recedes from the associated traffic apparatus 100). When signal strength is lost for a particular beacon system 291 (or if such signal strength falls below a predetermined threshold, for example), then remote device 900 may record (or transmit) a location of that particular beacon system 291 (and thus, a location of the traffic apparatus 100 to which it is affixed) when its signal strength was at or near a maximum. In the foregoing manner, either during deployment or after, a position ("location data") for each traffic apparatus 100 in arrangement 420 may be ascertained from acquired apparatus data, recorded, and/or transmitted by remote device 900.

Location data based upon apparatus data may be forwarded from remote device 900 to another data processing system or platform, illustrated on the right side of FIG. 4 as central system 410. As noted above, remote device 900 may, additionally or alternatively, transmit raw apparatus data to central system 410 for processing; in such an embodiment, location data for each traffic apparatus 100 in an arrangement 420 may be derived at central system 410, for example, where processing resources and power consumption parameters may be less restricted than at remote device 900. In that regard, it is worth noting again that derivation of location data from raw, or unprocessed, apparatus data may be implemented at remote device 900, at central system 410, or at both, operating either individually or in cooperation; these various data processing strategies may be selected in accordance with the processing capabilities and telecommunications bandwidth of remote device 900 or a variety of other factors.

It is noted that central system 410 may be embodied in or comprise a computer server or series of servers, workstations, desktop or laptop computers, or other similar data processing components useful for providing the functionality described herein. The various components of central system 410 (such as bus architectures, memory controllers, data storage, input/output devices, network interface cards or other telecommunications interfaces, and the like) are generally known in the art and have been omitted from FIG. 4 for clarity.

In operation of system 400, proprietary software instruction sets may be executed, such as by central system 410, remote device 900, or a combination of both, to analyze acquired apparatus data transmitted by beacon system 290 and to write those data and the results of any computations to memory (not shown) at central system 410. In the foregoing manner, central system 410 may acquire and maintain a detailed map recording a location of each traffic apparatus 100 deployed in a particular arrangement 420.

In some implementations, location data may be aggregated with map data (available from a variety of third party navigation software providers, for instance) such that a map of a particular arrangement 420 and its constituent traffic apparatus 100 may be superimposed upon or otherwise integrated with road map data, satellite imagery data, or both. In one such embodiment, for instance, location data may be integrated with road map or satellite data at central system 410, which may serve or transmit aggregated data to various third party platforms 490. In another embodiment, additionally or alternatively, central system 410 may serve or transmit location data to third party platforms 490, which may then integrate or aggregate such location data with their own proprietary data or software applications. In that regard, third party platforms 490 may include those owned or operated by, for example, federal, state, or local departments of transportation (DOT) or law enforcement, the National Transportation Safety Board (NTSB) or other regulatory authority, automobile manufacturers (for use in connection with onboard navigation aids or mapping software applications), suppliers of navigation software applications or solutions, and the like.

The connection between central system 410 and third party platforms 490 may be via the Internet, for example, or some other wide area network, and may be wired or wireless. The present disclosure is not intended to be limited by the type of telecommunications technologies used by any of the parties illustrated in FIG. 4, nor is it intended to be limited by which of the parties integrates location data with map or satellite data. Those of skill in the art will recognize that the architectural arrangement of FIG. 4 is susceptible of various alternatives and modifications.

By way of example, it is noted that many smart work zone, commercial vehicle fleet management, and navigation systems employ real-time and historical traffic flow data for a variety of purposes. One such system promulgated by Signalisation Ver-Mac, for instance, is referred to as Jam Logic™, and uses traffic flow data to update road-side or overhead signage or network accessible navigational tools responsive to changes in traffic speed or flow patterns. Additionally, a number of commercially available mapping and navigational aids that are available via the Internet or proprietary telecommunications networks can provide visualizations of traffic congestion or locations of wrecks, road closures, or other hazards using data acquired from road-side traffic apparatus 100 such as those described above. It may be desirable in connection with these and other systems, however, to know where particular traffic apparatus 100 are along a route and to provide a motorist with an advanced alert (i.e., prior to the motorist's arrival within visual range), regarding what information a particular traffic apparatus 100 may be intended to convey. In particular, the road crew or a traffic control entity responsible for setting up individual traffic apparatus 100 may want to ensure, via data maintained at central system 410, for example, that a particular arrangement 420 is deployed properly, as well as when and if a traffic apparatus 100 has been moved, e.g., by wind, rain, collision, vandalism, etc. By periodically moving remote device 900 in and around arrangement 420, location data maintained at central system 410 may provide information that is useful for road crews or traffic control administrators to determine whether adjustments or relocation of one or more traffic apparatus 100 may be necessary or desirable.

Employing electronics to determine when apparatus data are to be transmitted, and how much apparatus data are to be transmitted, may allow the powered components of beacon system 290 (particularly sensors 292 and transmitter 291) to conserve power. Since apparatus data need not be continuously processed and transmitted, and may be transmitted only periodically, only when remote device 900 is in close proximity, or (for example) only when an accelerometer or other motion detection device determines that traffic apparatus 100 has been moved, beacon system 290 may save on power such that a small photovoltaic panel or small chemical battery cell may be capable of providing sufficient power for most use cases.

Figure 5:
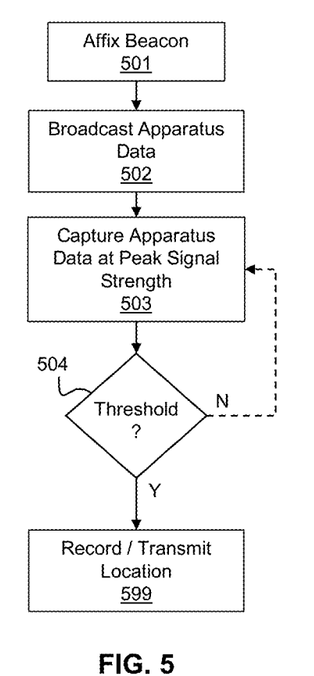
FIG. 5 is a flow diagram illustrating aspects of a method of acquiring and maintaining traffic apparatus location information.

FIG. 5 is a flow diagram illustrating aspects of a method of acquiring and maintaining traffic apparatus location information.

As indicated at block 501, a beacon (such as beacon system 290) may be affixed to a traffic apparatus 100 such as set forth above with reference to FIGS. 2 and 3. The term "affixed" in this context is intended to be construed broadly enough to encompass embodiments in which beacon system 290 is integrated with a structural component of traffic apparatus 100, and may not require mechanical fasteners, adhesives, or other coupling elements.

As indicated at block 502, a beacon may broadcast (such as via transmitter 291, for instance) apparatus data associated with the traffic apparatus 100 to which it is affixed. As noted above, this may be accomplished utilizing data provided by one or more sensors 292 disposed on or attached to beacon system 290 as well as data provided by memory 299. Apparatus data from these sources may be combined, multiplexed, or otherwise integrated for transmission by transmitter 291, or they may be broadcast in discrete or separate data streams. In particular, memory 299 may store an apparatus identifier (apparatus ID) that distinguishes a traffic apparatus 100 from others that are deployed in proximity as well as a functional identifier (functional ID) that is associated with or defines the functionality of the traffic apparatus 100. Positioning, orientation, and movement or acceleration data may also be provided for real-time or near real-time system applications.

In some embodiments, apparatus data may be transmitted only periodically or intermittently, such as at a frequency of once every five seconds, once every ten seconds, once per minute, etc. Additionally or alternatively, beacon system 290 may comprise a transceiver device that is configured and operative to be responsive to signals from remote device 900; in such embodiments, apparatus data may be transmitted by transmitter 291, for example, responsive to requests from, or a detected proximity of, remote device 900. These embodiments may prolong battery life or minimize amperage draw by components of beacon system 290, for example, and may have particular utility in applications which favor low power consumption.

Broadcast apparatus data may be captured, for example, by a remote device or instrument such as remote device 900. As indicated at block 503, apparatus data sufficient to identify a location of traffic apparatus 100 may be captured when a signal from transmitter 291 is at peak signal strength, as measured by remote device 900 (i.e., generally, when remote device 900 is closest to beacon system 290). As noted above, this may be effectuated by moving remote device 900 in and around an arrangement 420 of traffic apparatus 100; typically, it is expect that signal strength identified by remote device 900 will increase as remote device 900 approaches a location of traffic apparatus 100 and decrease as remote device 900 is moved away. In some embodiments, it may be desirable to use GPS or other mapping or location functionality resident at remote device 900 to acquire or to validate location data associated with a particular traffic apparatus 100.

Signal strength and sampling of apparatus data may continue periodically or repeatedly until a threshold low signal strength is reached, as indicated at decision block 504. As noted above, if remote device 900 is within a particular range of a particular traffic apparatus 100, signal strength may be above a predetermined or desired threshold, and sampling may continue; when signal strength drops below a threshold, however, remote device 900 may acknowledge loss of signal and record apparatus data at the point when signal strength was at a peak. In the foregoing manner, remote device 900 may ascertain a location of each traffic apparatus 100, along with apparatus ID and function ID, by moving relative to the traffic apparatus 100 deployed in a particular arrangement 420; these data may be recorded (e.g., by remote device 900 for later transmission) or simply transmitted by remote device 900 (e.g., to central system 410) for recordation or further processing as indicated at block 599. As noted above, in instances where apparatus data do not include GPS or other specific data to locate a particular traffic apparatus 100 in two- or three-dimensional space, location data may be derived from or informed by cellular, navigational, GPS, or other location information resident on remote device 900 and measured or computed at the time that a threshold signal strength is reached for that particular traffic apparatus 100.

The arrangement of the blocks and the order of operations depicted in FIG. 5 are not intended to exclude other alternatives or options. For example, the operations depicted at blocks 503 and 599 may occur substantially simultaneously in some implementations. Further, a different type of threshold and iterative loop may be employed, and the thresholds may vary as function of the type of processing expected or desired to be carried out by remote device 900. For example, rather than a low signal strength threshold to exit the loop of block 503 and decision block 504, a high signal strength threshold may be used instead, such that the loop is exited when signal strength begins to drop (e.g., as remote device 900 begins to recede from traffic apparatus 100).

In accordance with the foregoing, a traffic control agency or other governmental or regulatory authority may ascertain and maintain the location of a portable (i.e., non-permanent) traffic apparatus 100, and may review and validate the integrity of an arrangement 420 of same, without incurring the deleterious effects of additional or onerous workflow changes. The foregoing system and method introduce no additional recurring fees (such as subscriptions, for example) and may be implemented at low cost (since the beacon system 290 components may be implemented simply and cheaply, with low power requirements). The suppliers or lessors of traffic apparatus 100 may be enabled to access location information for every traffic apparatus 100 deployed in the field, and may uniquely identify every asset's purpose and location; this may have utility in marketing, business development, and other contexts. Those responsible for road conditions and traveler safety (such as DOTs, law enforcement officials, or local transportation boards) may be enabled to access information sufficient to assess road conditions and to identify road closures and local hazards. Autonomous vehicle developers may benefit from available aggregated data by integrating apparatus data and location data into their automated control systems, increasing safety with advanced warnings of road conditions or hazard zones.

Several features and aspects of a system and method have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the present disclosure be considered as limited only by the scope of the appended claims.

What is claimed is:

1. A method of acquiring and maintaining location information associated with a traffic apparatus; said method comprising:
    affixing a beacon system to the traffic apparatus, the beacon system operative to broadcast apparatus data associated with the traffic apparatus to a remote device operated by a traffic control agency;
    capturing the apparatus data responsive to a measure of a signal strength of the beacon system;
    deriving location data associated with the traffic apparatus responsive to said capturing; and
    responsive to said deriving, recording a location in space at which the traffic apparatus is deployed.

2. The method of claim 1 wherein the beacon system is operative to broadcast the apparatus data periodically at a frequency.

3. The method of claim 1 wherein said capturing is responsive to a peak signal strength.

4. The method of claim 1 wherein said deriving comprises utilizing the apparatus data.

5. The method of claim 1 wherein the beacon system is operative to broadcast the apparatus data responsive to a proximity of the remote device.

6. The method of claim 5 wherein said deriving comprises utilizing positioning data resident on the remote device.

7. The method of claim 1 wherein the apparatus data include a unique apparatus identifier.

8. The method of claim 1 wherein the apparatus data include a functional identifier associated with a function of the traffic apparatus.

9. The method of claim 1 further comprising transmitting the apparatus data from the remote device to a computer processing system.

10. The method of claim 9 wherein said deriving comprises utilizing the computer processing system.

11. The method of claim 9 wherein said recording comprises utilizing the computer processing system.

12. The method of claim 11 further comprising transmitting the location data from the computer processing system to a third party platform.

13. A traffic apparatus location system comprising:
a traffic apparatus;
a beacon system affixed to said traffic apparatus, said beacon system to broadcast apparatus data associated with said traffic apparatus;
a remote device to receive the apparatus data broadcast by said beacon system, said remote device operated by a traffic control agency; and
a computer processing system to receive information associated with the apparatus data from said remote device;
wherein the apparatus data are used to derive location data associated with a location in space at which said traffic apparatus is deployed.

14. The system of claim 13 wherein the location data are included in the apparatus data broadcast by said beacon system.

15. The system of claim 13 wherein said beacon system is operative to broadcast the apparatus data periodically at a frequency.

16. The system of claim 13 wherein said beacon system is operative to broadcast the apparatus data responsive to a proximity of said remote device.

17. The system of claim 16 wherein the location data are derived based on a location of said remote device.

18. The system of claim 17 wherein the location data are derived by said remote device.

19. The system of claim 17 wherein the location data are derived by said computer processing system.

20. The system of claim 13 wherein the apparatus data include a unique apparatus identifier.

21. The system of claim 13 wherein the apparatus data include a functional identifier associated with a function of said traffic apparatus.

22. The system of claim 13 wherein said remote device is a wireless telephone.

23. The system of claim 13 wherein said remote device is a tablet computer.

24. The system of claim 16 wherein said beacon system comprises a wireless transceiver and is configured and operative to initiate the broadcast responsive to a signal from said remote device.

25. The system of claim 14 wherein said beacon system comprises one of a global positioning system sensor, a gyroscope, an altimeter, a compass, and an accelerometer.

26. The system of claim 13 wherein said computer processing system is operative to transmit the location data to a third party platform.

27. A traffic apparatus comprising:
a structure to convey information to a motorist; and
a beacon system affixed to said structure, said beacon system to broadcast apparatus data associated with said structure to a remote device, the remote device operated by a traffic control agency and configured and operative receive the apparatus data broadcast by said beacon system;
wherein the remote device transmits information associated with the apparatus data to a computer processing system and the apparatus data are used to derive location data associated with a location in space at which said structure is deployed.

28. The traffic apparatus of claim 27 wherein said structure comprises one of a drum, a delineator, a cone, a flasher, a fixed sign, a placard, a barricade, and a programmable sign.

29. The traffic apparatus of claim 27 wherein said structure comprises one identified in the Manual on Uniform Traffic Control Devices.

30. The traffic apparatus of claim 27 wherein said beacon system comprises a memory to store the apparatus data.

31. The traffic apparatus of claim 30 wherein said memory is selectively programmable.

32. The traffic apparatus of claim 31 wherein the apparatus data may be selectively programmed.

33. The traffic apparatus of claim 27 wherein said beacon system is operative to broadcast the apparatus data periodically at a frequency.

34. The traffic apparatus of claim 27 wherein said beacon system is operative to broadcast the apparatus data responsive to a proximity of the remote device.

35. The traffic apparatus of claim 27 wherein the apparatus data include a unique apparatus identifier.

36. The traffic apparatus of claim 27 wherein the apparatus data include a functional identifier associated with a function of said structure.

37. The traffic apparatus of claim 36 wherein the functional identifier is selectively programmable.

38. The traffic apparatus of claim 27 wherein said beacon system comprises a wireless transceiver and is configured and operative to initiate the broadcast responsive to a signal from the remote device.

39. The traffic apparatus of claim 27 wherein the location data are derived by said beacon system.

40. The traffic apparatus of claim 39 wherein said beacon system comprises one of a global positioning system sensor, a gyroscope, an altimeter, a compass, and an accelerometer.

41. The traffic apparatus of claim 27 wherein said structure is portable.

* * * * *